United States Patent [19]

Cunningham et al.

[11] 4,433,382
[45] Feb. 21, 1984

[54] APPARATUS FOR AUTOMATICALLY ADJUSTING THE PROGRAMMED LOCATION OF A ROBOT ARM

[75] Inventors: Carole S. Cunningham; Charles M. Linser; Brian J. Resnick; Ronald L. Tarvin, all of Cincinnati, Ohio

[73] Assignee: Cincinnati Milacron Inc., Cincinnati, Ohio

[21] Appl. No.: 285,378

[22] Filed: Jul. 20, 1981

[51] Int. Cl.³ .................... G05B 19/23; G06F 15/46
[52] U.S. Cl. .................................. 364/474; 364/513; 364/475; 364/191; 364/192; 364/193; 364/194
[58] Field of Search ............... 364/513, 191, 192, 193, 364/194, 474, 475; 318/568, 572

[56] References Cited

U.S. PATENT DOCUMENTS

| | | | |
|---|---|---|---|
| 3,318,195 | 5/1967 | Fitzner | 364/513 |
| 3,661,051 | 5/1972 | Dunne et al. | 364/193 |
| 3,672,834 | 6/1972 | Corbach | 318/568 |
| 3,845,284 | 10/1974 | Taguchi et al. | 364/513 |
| 3,914,678 | 10/1975 | Chynoweth et al. | 318/568 |
| 3,946,296 | 3/1976 | Lahm | 318/568 |
| 4,011,437 | 3/1977 | Hohn | 364/192 |
| 4,096,563 | 6/1978 | Slawson | 364/192 |
| 4,140,953 | 2/1979 | Dunne | 318/568 |
| 4,150,326 | 4/1979 | Engelberger et al. | 318/568 |
| 4,166,543 | 9/1979 | Dahlstrom | 364/513 |
| 4,178,632 | 12/1979 | Anthony | 364/513 |
| 4,356,554 | 10/1982 | Susnjara et al. | 364/513 |
| 4,362,977 | 12/1982 | Evans et al. | 364/513 |

*Primary Examiner*—Jerry Smith
*Assistant Examiner*—John R. Lastova
*Attorney, Agent, or Firm*—John W. Gregg

[57] ABSTRACT

Apparatus for adjusting the position of a robot arm in response to coordinate data supplied by an external user process control. During the execution of a programmed cycle of operation, a robot control causes the robot arm to move to a predetermined programmed position. In response to a programmed adjust function code, the robot control requests change-of-position information from the user process control. Depending on the actual position of the robot arm, the user process control may transmit a set of adjusted coordinate data to the robot control defining an adjusted position. The robot control moves the robot arm to the adjusted position and proceeds with the programmed cycle of operation.

8 Claims, 7 Drawing Figures

APPARATUS FOR AUTOMATICALLY ADJUSTING THE PROGRAMMED LOCATION OF A ROBOT ARM

BACKGROUND OF THE INVENTION

Typically, with program controlled robot arms, coordinate data defining the desired position and orientation of a function element on the end of a robot arm is determined during a teaching or programming mode of operation. In most applications, the relationship between the workpiece and the robot arm is relatively constant and does not change between the teaching and automatic modes. Therefore, in replaying the taught program during the automatic mode, the programmed coordinate data is capable of positioning the function element to an acceptable degree of accuracy.

However, there are applications where the relationship between the workpiece and the robot arm cannot be accurately defined during the teaching operation. Typically, the teaching operation occur by commanding the robot arm along predetermined axes of motion until the function element achieves its desired position and orientation in space. The coordinate data defining this desired position and orientation is then stored in a memory with associated process function information as part of the program. In contrast, other teaching techniques, e.g. an offline teaching technique, allows the program to be defined off-line or outside the operating environment. In this situation, the operating environment is modeled at a remote location; and a programmer defines a program of desired function element positions and orientations which together with process function information comprise the cycle of operation. The program is transferred to the robot control; aligned to the operating environment and executed. Unfortunately, there are a number of mechanical and electronic variables within the robot system which affect its positioning accuracy, i.e. its ability to absolutely locate a position in space in response to input data theoretically defining that position. For example, mechanical droop or sag will cause the actual vertical position to deviate from the desired vertical position defined by the programmed coordinate data. These variables are not a problem when teaching a program in the operating environment because the programmer can visually locate the desired positions.

The claimed invention may be utilized to compensate for the variables in the robot system which adversely affect the positioning accuracy of an off-line taught program. In an initial cycle of operation, the robot arm is moved to each programmed position; and at preselected positions, an adjust function cycle compares the actual position to the programmed position. If the difference exceeds a predetermined tolerance, the programmed coordinates are redefined to cause the robot arm to move to the desired position.

The invention may be utilized in other applications where the absoklute location of successive workpieces may change with each iteration of a programmed cycle of operation. Consequently, there is a need for a mechanism for adjusting the position of the function element from its programmed location. In this situation, the function element is moved to a first position relative to the workpiece; and an external apparatus determines the accuracy of the function element location relative to the workpiece. If the actual position is in error, the desired position coordinates are transferred to the robot control; and the function element is moved to the desired location. Thereafter, the remainder of the program is executed.

In other situations, the desired position and orientation may be checked at several stages during the cycle of operation, and an adjustment may be made from the programmed position and orientation.

It will be apparent to those who are skilled in the art that the claimed invention has further utilization. Through a series of adjust positioning moves, the adjustment capability may cause the robot arm to be very accurately positioned to a degree not possible using the programmed coordinate data alone.

Therefore, an object of the invention is to provide an apparatus for positioning the function element to a programmed position and orientation and permitting further coordinate data to be transferred to the robot control to adjust the function element to a desired nonprogrammed location and orientation. Thereafter, a further adjustment may be made, or the program may be continued.

According to a further object, the coordinate data defining the adjusted position and orientation may be used only once or may be substituted for the programmed coordinate data thereby causing the function element to move to the adjusted position and orientation during subsequent executions of the program.

SUMMARY OF THE INVENTION

According to one embodiment of the invention, an apparatus is provided for automatically moving a function element of a machine to a number of locations in response to sets of input signals defining the function element positions and orientations relative to a rectangular coordinate system. The apparatus is connected to a user process control for selectively adjusting the final position and orientation of the function element in response to an adjust function signal associated with selected sets of input signals. The machine includes machine members and actuators for providing a plurality of axes of motion to control the position of the tool centerpoint and further actuators associated with the members for providing rotational axes of motion to control the orientation of the function element. A machine control is connected to the robot arm and includes a memory for storing programmed sets of input signals and a data communications interface for exchanging sets of input signals between the user process control and the machine control. The machine control further includes a servomechanism circuit which is connected to the actuators to control the position and motion of the tool centerpoint between predetermined points and simultaneously to rotate the functional element about the work point through continuous changes in orientation. The machine control executes the process of recalling from the memory a first set of input signals and commanding the actuators to move the function element to the position and orientation defined by the first set of input signals. In response to the presence of an adjust function signal in association with the first set of input signals, the machine control conditions the data communications interface to establish an active data link between the user process control and the machine control. Thereafter, the machine control receives from the user process control a new set of input signals representing a desired position and orientation of the function element; and the machine control commands the actuators to move the function element to the desired position and orientation. The machine control is effective to iterate the above process for each set of input signals stored in the memory.

DESCRIPTION OF THE PREFERRED EMBODIMENT

Figure 1:
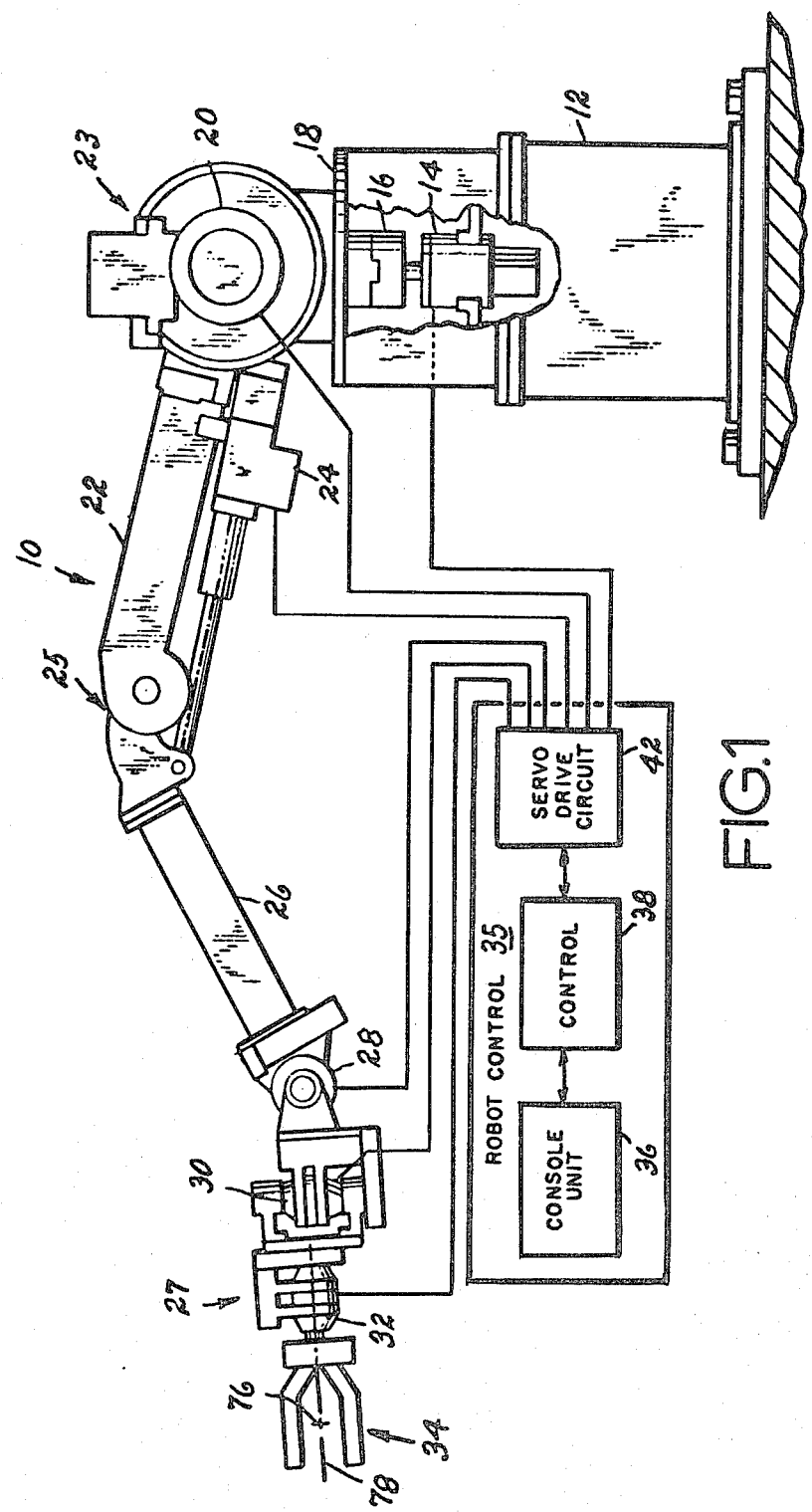
FIG. 1 is an overall view of a robot arm and illustrates its relationship to a general block diagram of the robot control.

FIG. 1 is an illustration of a commercially available robot arm, and FIG. 1 further includes a general block diagram of a robot control. As used herein, the term robot arm encompasses any machine which may be subject to the claimed invention.

The illustrated robot arm 10 is comprised exclusively of axes of rotary motion. A base 12 contains an acutator 14 which is connected by means of a coupling 16 to a rotatably mounted plate 18. It should be noted that the exact nature of the actuator 14 is not significant to this disclosure. Prior art actuators and control methods whether the actuator is electric, hydraulic, pneumatic, etc. are applicable. Rigidly fixed to the plate 18 is an acutator 20 providing a second axis of rotation. An upper robot arm member 22 is attached to a working member of the actuator 20. Affixed to the upper arm 22 is an actuator 24 which provides a rotation of the lower robot arm member 26 about the upper arm member 22. The first plurality of actuators 14, 20 and 24 are sufficient to move the end of the robot arm to any point in space within its range. A wrist 27 is comprised of rotary actuators 28, 30 and 32 and is connected to a function element 34 which may be represented by many types of tooling. The second plurality of actuators 28, 30 and 32 are effective to move the function element through successive changes in angular orientation.

The position of the end of the robot arm is measured relative to a workpoint or tool centerpoint associated with the function element. The exact location of the tool centerpoint will be a function of the tooling used. For example, the tool centerpoint may be the point at which gripping tongs come together, e.g., point 76, the centerline at the end of a cutting tool, the point at which welding heads come together, the center of the spray fan from a spray gun, the focal point of an optical head or vision sensor, etc. It should be noted that the function element 34 may have a small acutator (not shown) for generating the desired function, e.g., a gripping action. The physical configuration of the above machine provides a plurality of axes of rotary motion which when considered with the machine members define a generalized coordinate system.

Within a robot control 35, a console unit 36 is provided as a communication link to the robot arm. The console includes controls for programming or teaching the robot arm a cycle of operation and input devices for generating input signals to enable the predetermined cycle of operation. A control 38 utilizes programs and input signals to produce control signals to a servomechanism drive circuit 42 which commands the actuators on the robot arm to move the tool centerpoint between the programmed points and to rotate the function element through angular changes of orientation.

A robot arm and control as described herein corresponds to the T3 industrial robot and control commercially available from Cincinnati Milacron Inc. Further, the detailed operation of the robot arm in its automatic mode of control is described in U.S. Pat. No. 3,909,600; and a description of the method and apparatus utilized for teaching the robot arm a program is described in U.S. Pat. No. 3,920,972.

Figure 2:
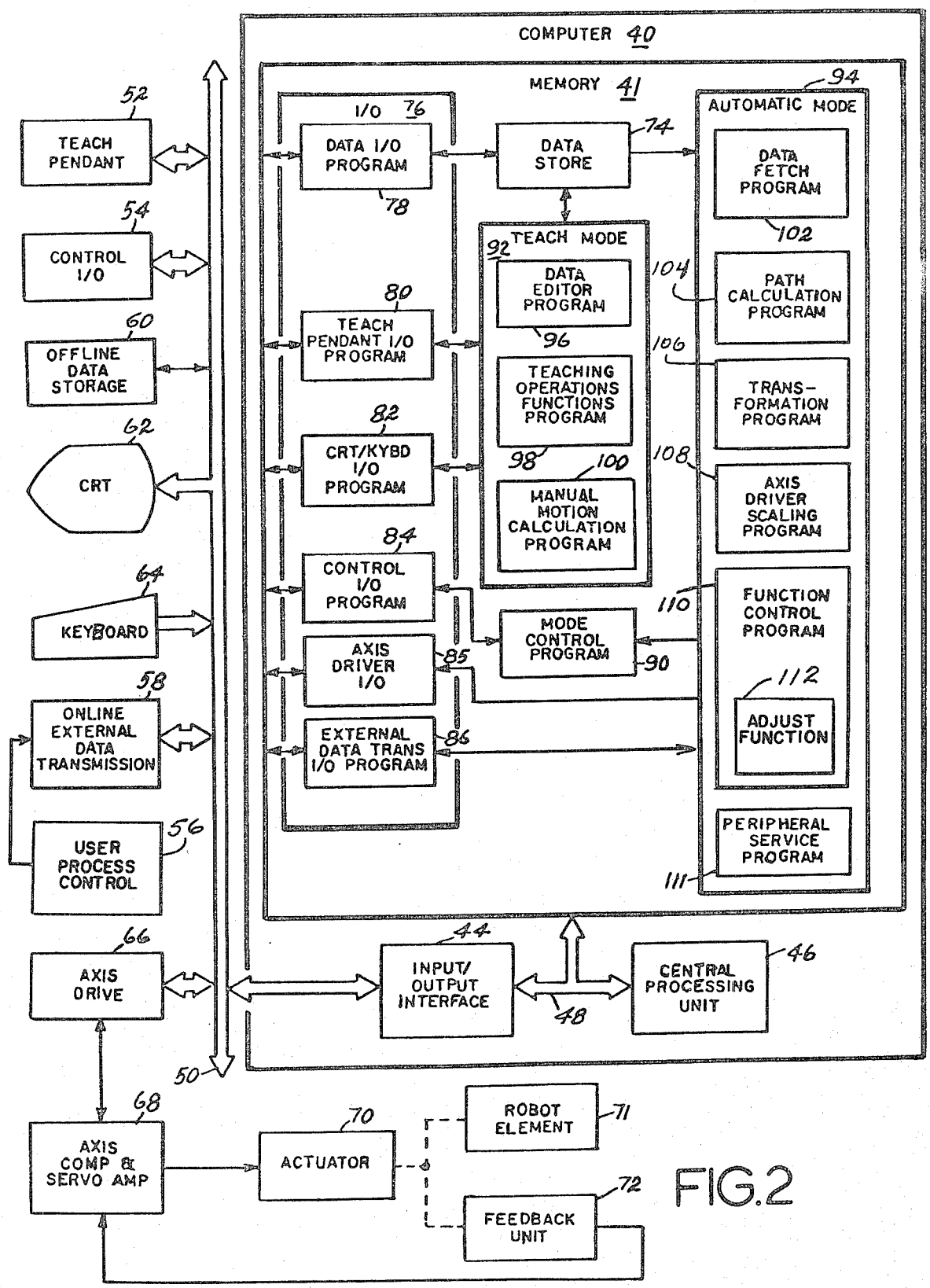
FIG. 2 is a detailed diagram of the computer based robot control for the robot arm.

FIG. 2 is a detailed block diagram illustrating the basic components of the commercially available robot control referenced above. A programmed computer 40 is comprised of a memory circuit 41, input and output interface circuit 44 and a central processing unit 46. These three main elements are interconnected by an internal bus 48. Control signals are passed to and from the computer 40 by means of an external bus 50 which is connected to a number of peripheral devices. First, a teach pendant 52 is a remote programming tool utilized by the operator to move the end of the robot arm to a number of desired positions and orientations during the teaching process. Next, control I/O 54 defines a number of miscellaneous machine signals which are necessary for the operation of the robot arm. The external data transmission I/O block 58 represents a device which allows data to be entered into the computer 40 from an external data store on a real time basis, i.e. while the robot arm is executing a cycle of operation. An off-line data storage unit 60 is provided for allowing programs to be input to the computer by means of such devices as a punched tape reader, a cassette reader, etc. The CRT 62 and keyboard 64 provide means by which the robot arm and its control are able to communicate messages to and from the operator.

The axis drive unit 66 accepts blocks of data from the computer on a periodic basis. Each block of data represents the incremental magnitude of motion of the robot arm actuators during each periodic interval. Further, the magnitude of motion over each fixed period inherently provides a definition of the desired velocity of the robot arm. The axis drive 66 accepts the data in digital form and executes a digital-to-analog conversion thereby providing an analog signal to the axis compensation and servoamplifier 68. The compensated analog signals are then used as an input to an actuator 70 which drives the robot elenent 71 mechanically attached thereto. A feedback device 72 is mechanically connected to the actuator and provides a feedback signal representing the actual motion of the driven element of the robot arm. It should be noted that although there are several configurations for control of the servomechanism loop for each element of the robot arm in the preferred embodiment, the axis drive 66, servoamplifier 68, actuator 70, and feedback element 72 are utilized in numbers equal to the number of controlled axes on the robot arm.

The memory 41 within the computer 40 is comprised of two basic components. The first being the data store 74 which stores all numerical data information, and the remainder of the memory is defined as the operating system of the robot arm. The operating system may be characterized as a control program which defines how data is to be generated and utilized during the operation of the robot arm.

The first section of the operating system is an I/O section 76. The I/O programs include a data I/O program 78, teach pendant I/O program 80, a CRT and keyboard I/O program 82, a control I/O program 84, an axis driver I/O program 85 and an external data transmission I/O program 86. It will be noted that there is an I/O program corresponding to each different type of peripheral being interfaced into the control system. Each I/O program is uniquely responsive to the data produced by each peripheral device and is effective to control the flow of signals from the peripheral devices into and out of the computer.

The operating system also contains a mode control program 90 which exercises overall control over the operating system. The mode control program 90 switches control of the computer between the various operating modes, e.g., manual, teach, automatic, etc. Within the teach mode system 92, a data editor program 96 and a teach program 98 control the operation of the robot arm during the teach mode. The specifics of these programs are described in U.S. Pat. No. 3,920,972. During the teach mode, the position and orientation of the function element required to execute a cycle of operation are defined. Using teaching controls, the function element is moved along axes of motion defining a rectangular, cylindrical or other nongeneralized coordinate system. When a desired position and orientation is achieved, a set of input signals representing rectangular coordinate values of the desired position and orientation are stored in the data store 74 of the memory 41. The set of input signals may further include a function code which represents a particular operation or function to be executed at the desired location, e.g. the operation of a tool, testing of an internal or external signal state, etc. By iterating the above process, a complete cycle of operation may be programmed.

The automatic mode system 94 is comprised of a data fetch program 102, a path calculation program 104, a transformation program 106, an axis driver program 108, a function control program 110 and a peripheral service program 111. The details of these programs are either specifically described in U.S. Pat. No. 3,909,600. The automatic mode causes the function element to move between the programmed positions. This motion may be point-to-point or may be along predetermined paths, e.g. straight line paths. In the preferred embodiment, the programmed path is defined by a series of intersecting straight line paths with the programmed positions representing the points of intersection of the straight line paths.

In utilizing the claimed invention, if a particular position or orientation is identified as one to which an adjustment may be required, an adjust function signal must be programmed with the set of input signals representing coordinate data defining the particular position and orientation. The adjust function may be utilized with any selected points in the program. When the taught program is executed, the automatic mode programs 94 of FIG. 2 will cause the function element to move to the programmed position and orientation; and the adjust function cycle defined by the program 112 within the function control program 110 will be executed. The adjust function initiates communication with a user process control 56 by activating a data communications interface comprised of the external data transmission I/O, an external bus 50 and external data transmission I/O program 86. The user process control includes a sensor which may be visual, tactile or any other device for sensing the position and/or orientation of the robot are relative to another element in the process. The sensor may be attached to the robot arm and used to sense a point on a workpiece; it may be mounted relative to the workpiece or another element in the process to detect the tool centerpoint position or function element orientation; or it may be applied to sense both the tool centerpoint and another point associated with the process. Consequently, the definition and operation of the sensor will depend on the particular application of the robot arm in the process. However, its ultimate purpose in all applications is to provide new input signals representing the desired absolute position of the function element relative to a reference. The user process control is responsive to the sensor data and determines how closely the actual position and orientation of the robot arm corresponds to a desired predetermined position and orientation. If the actual and desired position or orientation does not sufficiently correspond, the user process control 56 generates a new set of input signals representing adjusted coordinate data relative to the rectangular coordinate system defining the desired position and orientation. The new set of input signals is transmitted back to the path calculation program 104 of the robot control.

This program and the others in the automatic mode section 104 cause the robot arm to move to the desired position and orientation defined by the adjusted coordinate data. The adjust function again initiates communication with the user process control, via the data communications interface; and the sensor checks the adjusted position and orientation against the desired position and orientation. If the actual and desired position and orientation does not correspond after one iteration, the above process is repeated until a correspondence occurs. When correspondence is achieved, the user process control transmits an acknowledge signal back to the robot control. The acknowledge signal defines the completion of the adjust function, cycle and the programmed cycle of operation continues.

By utilizing a special code in association with the adjust function code, the user may cause the current new set of input signals representing the adjusted coordinate data to be stored in the data store 74 in place of the programmed set of input signals defining the predetermined position and orientation. Consequently, the adjusted coordinate data will be available for use during subsequent executions of the program.

The invention provides the user of the robot arm with the capability of selectively adjusting the actual final position and orientation of the robot arm during the automatic mode of operation, thereby allowing the robot arm to adapt or conform on a real time basis to characteristics in the operating environment which may have changed from the time the program for the robot arm was defined. The actual manifestation of the elements in the user process control and the method by which the elements are used to determine adjusted coordinate data are not important to the claimed invention. The definition, combinations and method of use of these user elements is limitless; and their exact configuration and operation will depend on the sophistication, budget, and experience of the user as well as the parameters and variables surrounding the application or process being implemented. The claimed invention does require the existence of a user process control capable of transmitting a set of input signals representing coordinate data to the robot control. This requirement may be satisfied by a wide range of currently available technologies.

Figure 3:
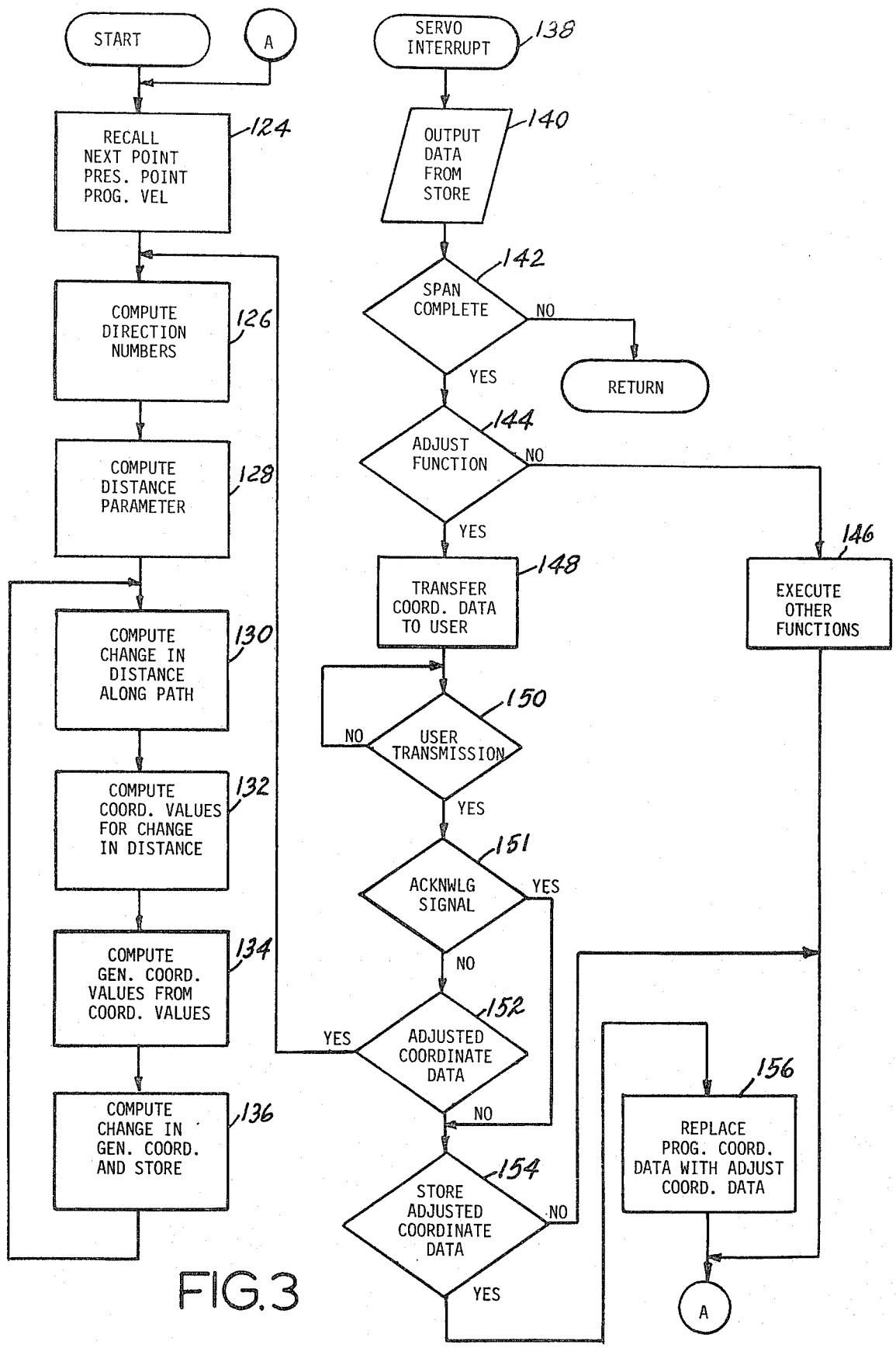
FIG. 3 is a detailed flow chart illustrating the process steps for executing applicant's method of control and includes the detailed process steps for executing the adjust function.

FIG. 3 illustrates a flow chart defining the process steps of the preferred embodiment for executing the automatic mode of operation. Process block 124 recalls the coordinate values of two predetermined points and the predetermined path velocity from storage. Process step 126 computes the direction numbers. Each direction number has a sense representing the direction of motion and a magnitude proportional to a coordinate component of the path between the programmed end points. Process step 128 computes the distance parameters along the path between the predetermined points, and process step 130 computes the change in distance along the path during each iteration. Next, using the direction numbers, a set of intermediate signals representing the rectangular coordinate values defining an intermediate point for each change in distance is generated by process step 132. Therefore, the computation of the coordinate values of an intermediate point along the path during each iteration requires the operation executed by process steps 126, 128, 130 and 132. Operation step 134 generates the individual control signals representing generalized coordinate values corresponding to coordinate values calculated to process step 132. Since the details of process step 134 may be found in U.S. Pat. No. 3,909,600, they will not be discussed here. Finally, process step 136 computes the changes in the generalized coordinate values from the present point to the intermediate point and stores this set of differentials in a buffer store awaiting an interrupt from the servomechanism drive circuit 42. A number of sets of differentials may be queued in the buffer store at one time.

The above process operates asynchronously with the servomechanism drive circuit 42. The circuit 42 operates on a fixed time base sampling system; in other words, at fixed predetermined intervals of time, the servomechanism request new information from the computer. By operating the servomechanism at a fixed sampling rate, the computer is provided with several advantages. For example, by knowing the length of the programmed path, the predetermined path velocity and the fixed length of a sample time, the computer is able in process step 128 to compute the number of iterations required to execute the programmed path. Consequently, with this information, the computer can then calculate the change in distance along the programmed path during each iteration. Further, as will be appreciated by those who are skilled in the art, the use of a fixed sampling time rate permits the computer to execute many other functions in addition to generating the predetermined path. Because the computer is substantially faster than the peripheral devices attached to it, a backlog of information to be output therefrom is generated. Consequently, a system of interrupts each having a particular priority is used.

The purpose of the servo-interrupt routine defined in block 138 is to transfer data from the buffer store in response to an interrupt from the servomechanism drive circuit 42. The interrupt may occur at any time during processing. When the interrupt does occur, control of the process is transferred from the main program to the servo-interrupt routine 138. Within the servo-interrupt routine 138, process step 140 transfers one of the queued sets of differential generalized coordinate values from the buffer store to the servomechanism drive circuit 42.

Next, decision step 142 tests if the path between the two predetermined points is complete, i.e. whether the robot arm has moved to the next point. If the path is not complete, the servo-interrupt routine returns control of the process back to the main program at the point where the interrupt occurred; and the process is continued. If the span is complete, the process executes the programmed function which was defined during the teach mode and stored with the coordinate data of the next point.

Process step 144 tests whether the function code represents an adjust function. If not, process step 146 executes whatever other function has been programmed; and beginning with step 124 the path generation is repeated. If an adjust function code has been programmed, an adjust function cycle is initiated by process step 148 conditioning the data communications interface to establish an active data link for exchanging sets of input signals between the robot control and the user process control. In the preferred embodiment, process step 148 transfers a first set of input signals representing the absolute rectangular coordinate data defining the programmed position and orientation of the robot arm. Process step 150 awaits the transmission of information back from the user process control. During this period of time, the user process control detects whether the actual position and orientation of the robot arm corresponds to the desired position and orientation. If there is a discrepancy, the user process control transmits a new set of input signals to the robot control defining adjusted rectangular coordinate values representing the desired position and orientation of the robot arm.

Process step 150 detects the user transmission of signals; process step 151 determines that the transmission is not an acknowledge signal; and process step 152 detects that the transmitted signals represent coordinate data. After receiving the new set of input signals, process step 126 computes new direction numbers using the current actual position and orientation of the robot arm as the present point and the adjusted coordinate data at the next point. Process step 128 computes new distance parameters, and steps 130 through 136 use the programmed velocity from the previous span to generate changes in generalized coordinate values representing command signals to cause function element motion to the adjusted position and orientation. The servo-interrupt routine operates as previously described to cause the robot arm to move to the desired position and orientation. At this point, process step 142 detects that the span is complete; and since the adjust function is being executed, process step 148 again transmits to the user process control the new set of input signals representing the rectangular coordinate values of the current robot arm position and orientation, i.e. the desired position and orientation defined by the adjusted coordinate data. As before, the user process control determines whether the position and orientation of the robot arm are acceptable. If not, a further set of new input signals representing adjusted coordinate data is transmitted back to the robot control representing a newly adjusted position and orientation. This process continues as described above until the user process control determines that the position and orientation of the function element is acceptable. At this time, it transmits an acknowledge signal to the robot arm control. The process step 150 receives the user transmission; process step 151 detects the acknowledge signal, and step 154 tests whether the adjust function code includes coding which requires the current new set of input signals be stored in memory in place of the programmed first set of input signals associated with the currently active adjust function code. If not, the acknowledge signal is effective to terminate the adjust function cycle; otherwise the adjusted rectangular coordinate values are stored and will be used during a subsequent execution of the program. At this point, the execution of the adjust function is complete, and the process executes step 124 which initiates the start of the path generation process using the next sequential programmed data.

FIGS. 4a, 4b, 4c and 4d comprise a detailed flow chart of the path generation process discussed in FIG. 3. In the preferred embodiment, the predetermined path between the programmed points is a straight line. Conversion of the flow chart in FIG. 4 into a coded computer program can be readily accomplished by one who is reasonably skilled in a programming language compatible with a general process control computer. The majority of operations shown in FIGS. 4a through 4c can be classed under the general process step of computing distance parameters shown in operation block 128 of FIG. 3. The process of FIG. 4 must solve the problem of determining whether or not a change of velocity is necessary; and further, the magnitude of said change in velocity.

Generally, a path between two programmed points may be divided into three separate spans. A first span may require an acceleration or deceleration depending upon the entry velocity into the span and the predetermined path velocity. A second span may be comprised of a constant velocity phase, and a third span may occur if a deceleration to a stop is required. Therefore, by examining the velocities at the programmed end points of the predetermined path, the computer is able to determine whether or not two or three velocity dependent spans are required. Once this determination is made, a further problem exists. If the required velocities as well as the permissible change of velocity are known, the length of each velocity dependent span may be calculated. However, the situation may exist where the sum of the ideal velocity dependent spans exceeds the length of the path between the programmed end points. This may occur when the adjust function requires the robot arm to move from a programmed position to an adjusted position. These particular cases have to be detected and handled on an individual basis. Consequently, the computation of distance parameters is not subject to a single solution. Further, the problem is not only in determining the correct solution but in the process time required to execute the correct solution.

Figure 4A:
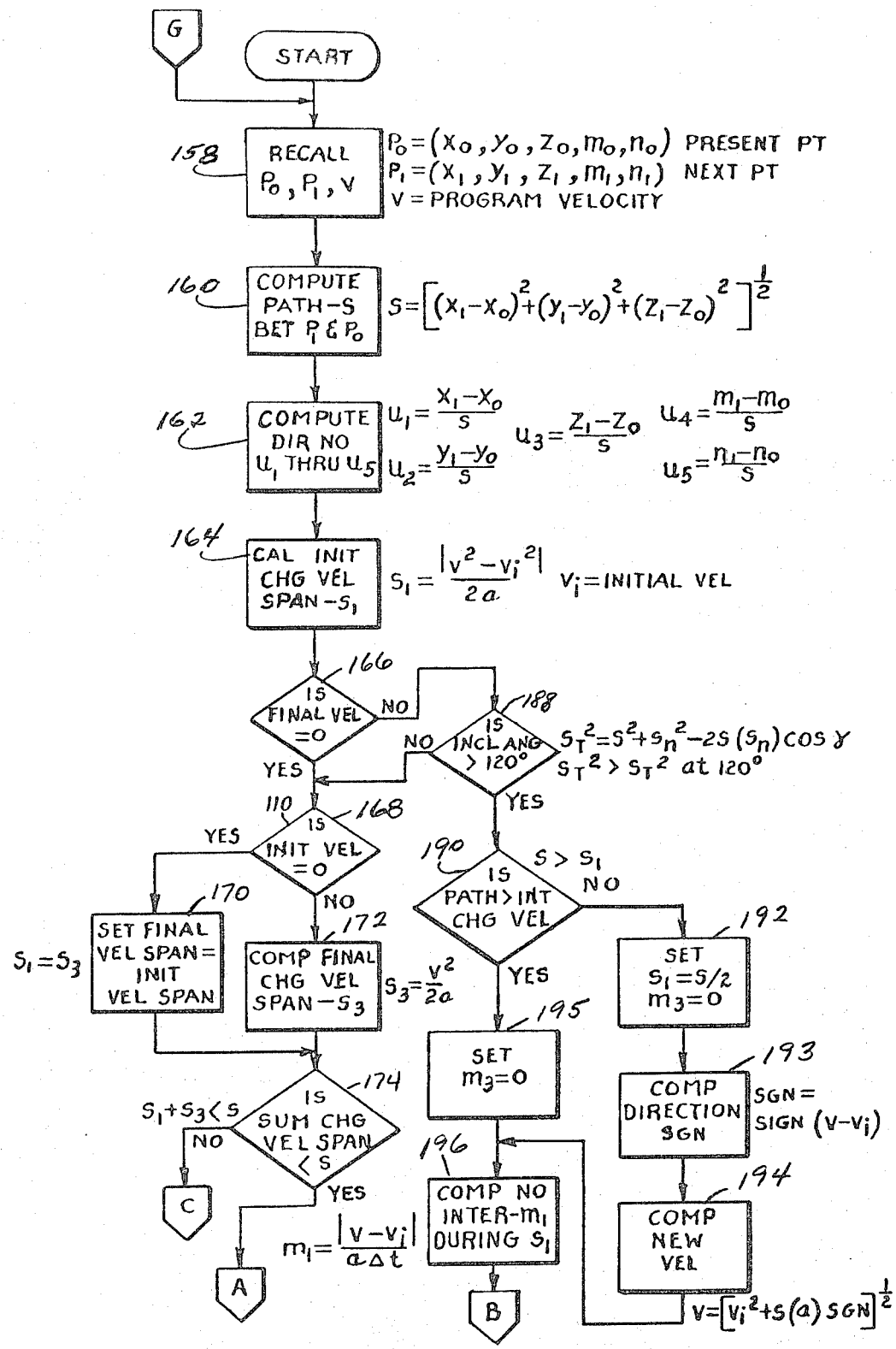
FIGS. 4a through 4d are a detailed flow chart illustrating the process steps for moving the tool centerpoint through linear paths and the function element through changes-of-orientation.
Figure 4B:
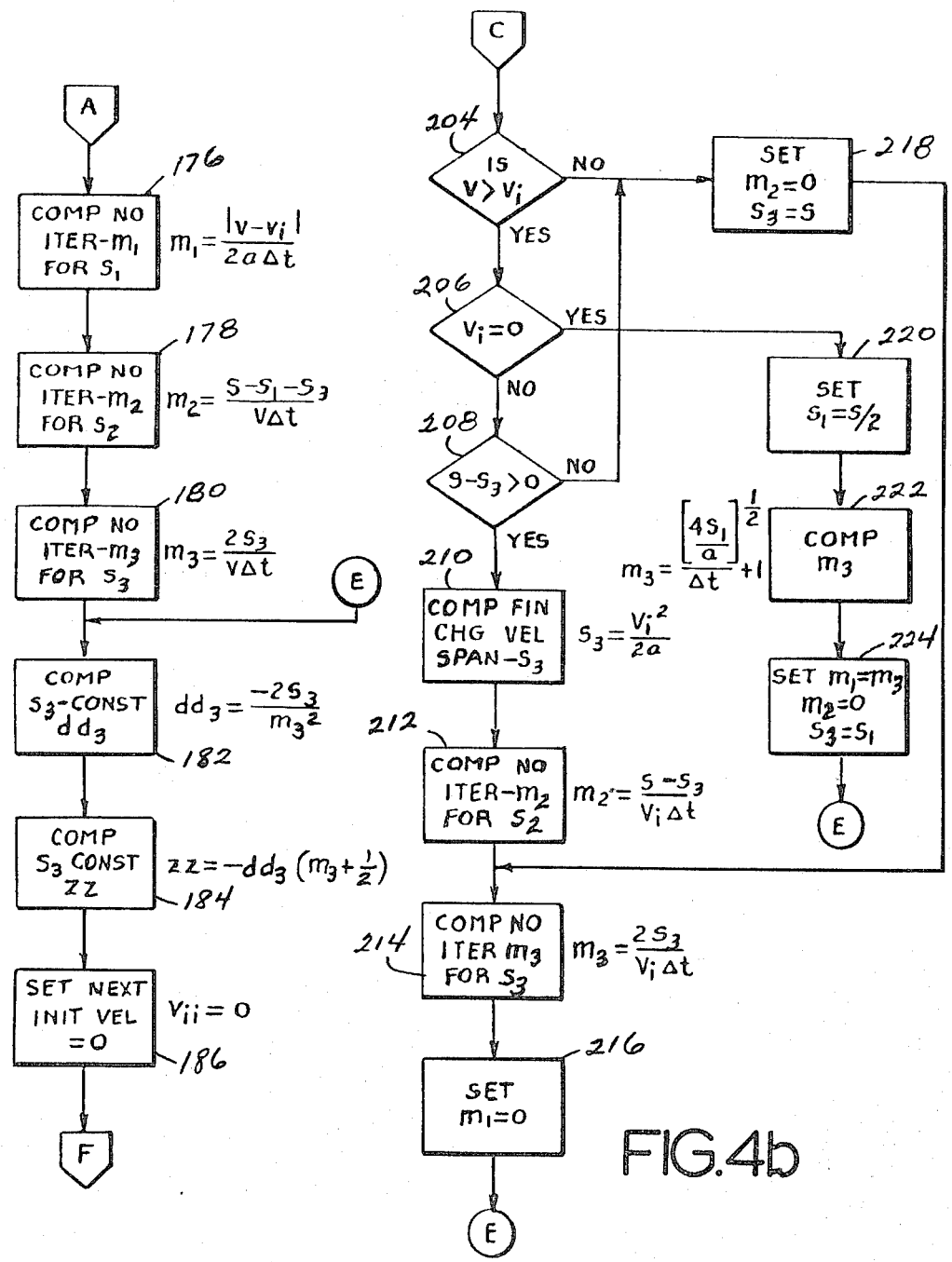
Figure 4C:
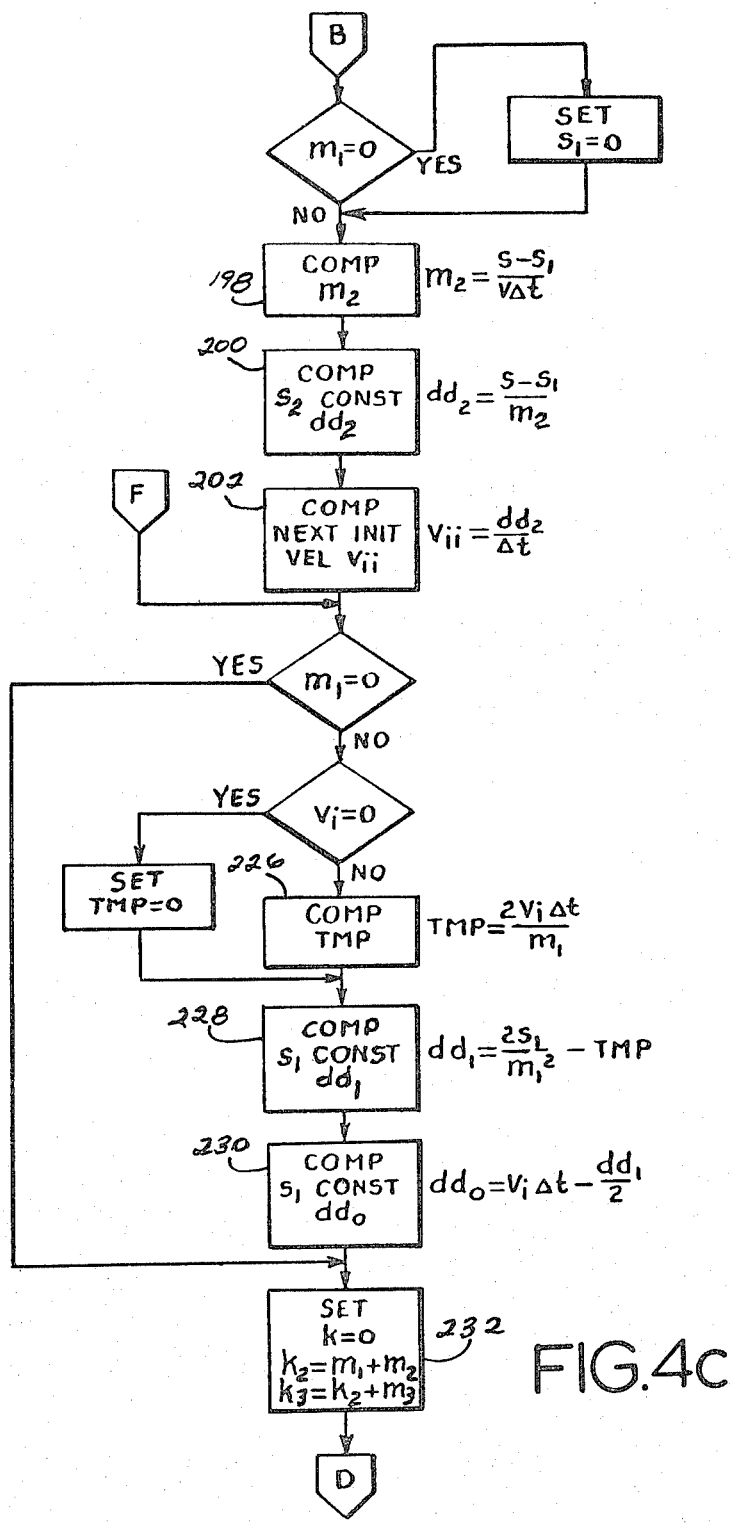

In FIG. 4a, the first step 158 in the process is to recall input signals from memory representing rectangular coordinate values defining the position and orientation at the present point, the coordinate values at the next programmed point and the programmed path velocity. Next, process step 160 requires the computation of the length of the total path. After computing the direction numbers in process step 162, the length of the initial change of velocity span $S_1$ is calculated in process step 164. Process step 166 determines whether the velocity at $P_1$ is zero. In other words, is there a stop between the execution of successive paths or are the successive paths executed in a continuous manner? If the final velocity is zero, the process step 168 tests if the initial velocity is zero. If the initial velocity and final velocity are both zero, step 170 sets the length of the final change-of-velocity span $S_3$ equal to the length of the initial change-of-velocity span $S_1$ calculated in process block 108. If the final velocity is zero, but the initial velocity is not zero, step 172 computes the length of the final change-of-velocity span. At this point, decision step 174 tests whether the sum of the change-of-velocity spans computed thus far is less than the length of the programmed path. If the sum of the lengths of the change-of-velocity spans is less than the length of the programmed path, the process continues via the offpage connector A. It should be noted at this point that the length of the constant velocity span will be equal to the difference between the length of the tool path and the length of the sum of the initial and final change-of-velocity spans. Offpage connector A continues in FIG. 4b. Knowing the lengths of each of the spans comprising the programmed path and the fixed time base of the sampling system, it is now possible to calculate the number of iterations required to execute each of the spans. These calculations are made by process steps 176, 178 and 180. Next steps 182, 184 and 186 are operative to calculate constants which are subsequently used in the process.

Returning to the test 166 in FIG. 4a, the determination that the final velocity is not zero means that the path moves continuously between successive program spans. Considering the dynamics of the robot arm, this may or may not be physically possible depending on the change in direction or the included angle between successive paths. An included angle of 120 degrees was arbitrarily chosen to be controlling in the test of step 188. If the included angle between successive paths is greater than 120 degrees, the successive paths are executed on a continuous basis. However, if the included angle is less than 120 degrees, the process automatically inserts a stop point; and the successive paths are executed in a discontinuous manner. The Law of Cosines is used to determine if the included angle is greater or less than 120 degrees. Next, process step 190 determines if the length of the initial change-of-velocity span is less than the length of the programmed path. If $S_1$ is not less than the programmed path, process step 192 arbitrarily sets the length of the initial change-of-velocity span equal to one-half the length of the programmed path. Further, in process step 194, a new velocity is computed. It should be noted that if successive program paths are to be executed continuously, there is no final change of velocity span $S_3$. Further, the number of iterations required to execute the final change-of-velocity span is equal to zero. If the length of the initial change-of-velocity span is less than the programmed path, the number of iterations required to execute the initial change-of-velocity span is computed in operation block 196. The offpage connector B is continued in FIG. 4c. In process blocks 198, 200 and 202, constants are computed which are used later in the process; and therefore, will not be discussed at this time.

Returning to FIG. 4a, the significance of the computation of distance parameters should be readily apparent. One special case has not been discussed in detail. This case arises with the test 174 where the sum of the lengths of the initial and final change-of-velocity spans is not less than the length of the total path. In this case, offpage connector C takes us to FIG. 4b. Blocks 204 through 224 define another special case which is similar in solution to the other special cases described earlier in detail. Therefore, the process at this point will not be described in detail, and the disclosure contained in blocks 204 through 224 will be deemed sufficient. After execution, this portion of the process continues via onpage connector E to block 182. The process then follows offpage connector F to FIG. 4c. Again, process blocks 226 through 232 define constants which are used later in the process.

Figure 4D:
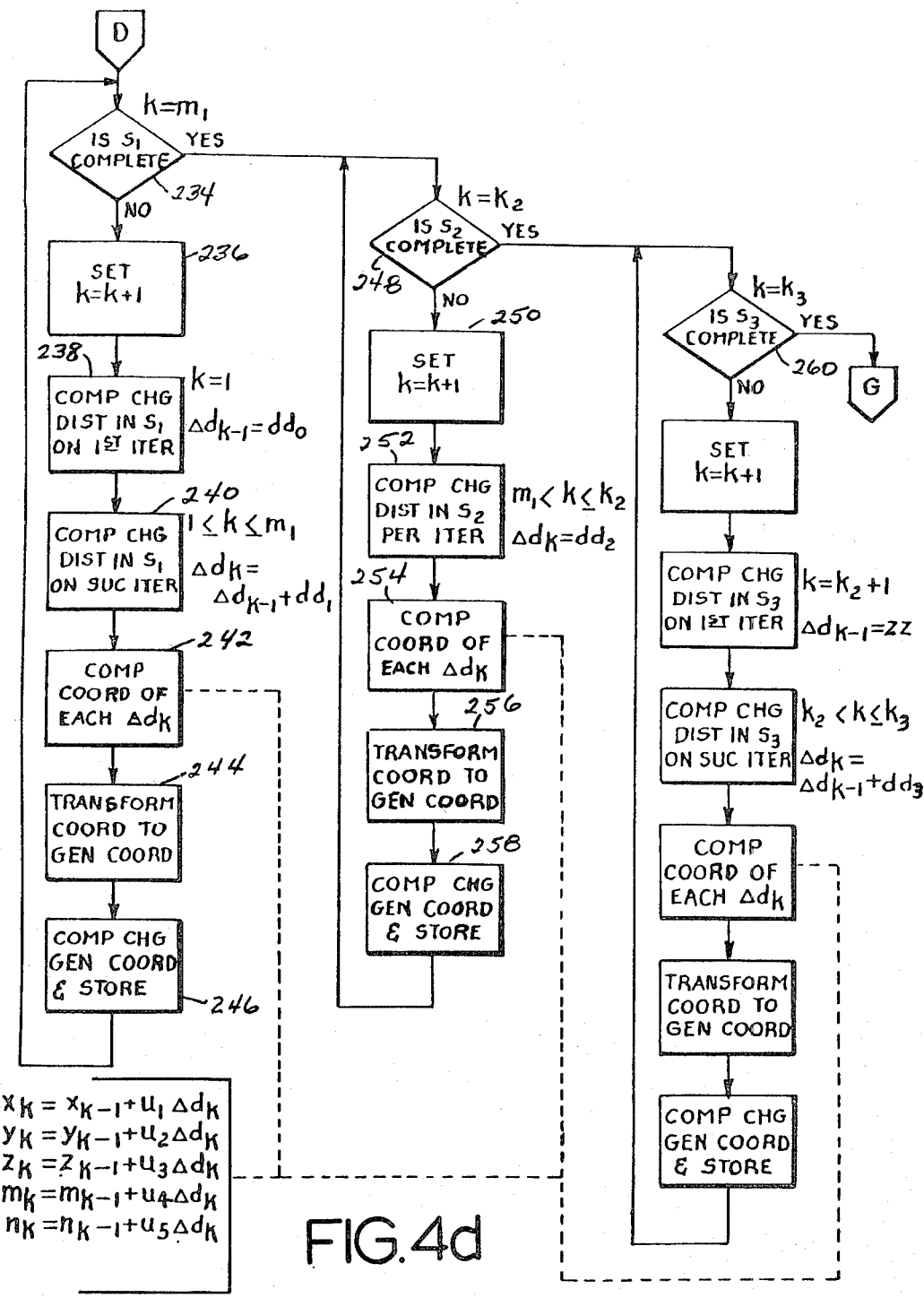

From offpage connector D, the process continues to FIG. 4d. Decision step 234 determines whether the initial change-of-velocity span is complete. If it is not, the process goes to step 236 which initiates the first iteration. The change in distance along the programmed path for each iteration in the first change-of-velocity span is determined by the relationship associated with step 240. Generally, it indicates that a change in distance along the path for a present iteration is equal to the change in the distance along the path during the previous iteration plus some constant (calculated earlier). The problem arises in calculating the change in distance along the first change in velocity span during the first iteration. This is a special situation which is handled according to the relationship associated with the process step 238. As indicated, the length of the change of distance along the path during the first iteration is equal to one of the constants which was calculated earlier. After executing the first iteration all successive iterations are handled via process step 240 until the number of iterations k is equal to the number of iterations calculated for the initial change in velocity span $m_1$. According to process step 242, the rectangular and angular coordinate values are computed for each change in distance along the path, or in other words, for each iteration. Further, process step 244 requires that these rectangular angular coordinate values be transformed into corresponding generalized coordinate values. In process step 246, the change in the generalized coordinates along the programmed path are computed and stored to be ready for an interrupt from the servomechanism drive circuit 42. The servointerrupt routine was discussed in reference to FIG. 3, and further discussion at this time is not necessary.

When the number of iterations is equal to the number of iterations computed for the initial change of velocity span, the process moves to the test 248 which determines whether the constant velocity span is complete. If the constant velocity span is not complete, the process execution steps 250 through 258 in an iterative manner until the number of iterations is equal to the sum of the iterations required to execute the initial change of velocity span $m_1$ and the constant velocity span $m_2$. When this occurs, the process moves on to decision block 260, where the process determines whether or not the final change-of-velocity span is complete. In a situation where there is continuous movement between successive programmed paths, there is not final change-of-velocity span; and therefore, $k_2$ is equal to $k_3$. In this case, when the constant velocity span is complete, the process proceeds to the offpage connector G. However, if the motion between successive program paths is discontinuous, the final change-of-velocity span must be computed in an iterative manner similar to the other velocity dependent spans. Consequently, the process moves from a present point to a successive programmed point in an iterative fashion with all the appropriate velocity parameters. When the final change-of-velocity span is complete, the process moves via the offpage connector G back to FIG. 4a and to process step 158.

FIG. 4 illustrates the process for moving the robot arm between programmed points. The same process is used during the execution of the adjust function for moving the robot arm from a current position to an adjusted position defined by the user process control. When the user process control transmits adjusted coordinate data back to the robot control, process of FIG. 4a begins with step 160. A new path length is computed using the current robot arm position as the present point data and the adjusted coordinate data as the next point data. The initial and final velocities will be zero and the path velocity will be set equal to the currently active program velocity which was programmed with the span containing the adjust function code. Since the path length to the adjusted position will probably be small, generally the test 174 will determine the sum of the change of velocity spans is not less than the programmed path. Therefore, the process will move via offpage connector C to steps 204 through 224 of FIG. 4b and thereafter, through FIGS. 4c and 4d as previously described.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for moving a tool centerpoint of a function element to positions defining a cycle of operation, the rectangular coordinates of positions being represented by programmed sets of input signals, the apparatus being connected to a user process control, the user process control producing further sets of input signals representing rectangular coordinates of adjusted positions, the adjusted positions being defined for selected programmed positions having adjust function signals associated therewith, the apparatus comprising:
   (a) a machine having machine members connected to one end of the function element and actuators associated with the machine members for providing a plurality of axes of motion to move the tool centerpoint, said plurality of axes of motion and the machine members defining a generalized coordinate system; and
   (b) a machine control including a memory for storing sets of input signals, a data communication interface for exchanging sets of input signals between the user process control and the machine control and a servomechanism circuit connected to the actuators, the machine control comprising
      (1) means responsive to stored input signals for controlling the actuators to move the tool centerpoint to successive programmed positions,
      (2) means responsive to the tool centerpoint arriving at a programmed position and to an adjust function signal for suspending the cyclic progression through successive programmed positions,
      (3) means responsive to a set of input signals received from the process control during suspension of cyclic operation for causing the actuators to move the tool centerpoint to an adjusted position, and
      (4) means for resuming the cyclic progression through successive programmed positions.

2. The apparatus of claim 1 wherein the machine control further comprises means for storing the input signals representing the adjusted position in place of the stored input signals for the position having the adjust function signal associated therewith.

3. The apparatus of claim 1 further comprising means responsive to the tool centerpoint reaching a programmed position for transmitting coordinate signals representing the current position of the tool centerpoint through the data comunications interface to the process control.

4. An apparatus for moving a tool centerpoint of a function element along intersecting paths in response to programmed sets of input signals representing rectangular coordinates of the points of intersection defining tool centerpoint positions, said apparatus being connected to a user process control, the user process control producing further sets of input signals representing rectangular coordinates of adjusted positions, the adjusted positions being defined for selected intersection positions having adjust function signals associated therewith, the apparatus comprising:
(a) a robot arm having arm members connected to one end of the function element and actuators associated with the arm members for providing a plurality of axes of motion to move the tool centerpoint, said plurality of axes of motion and the arm members defining a generalized coordinate system; and
(b) a robot control including a memory for storing sets of input signals, a data communications interface for exchanging sets of input signals between the user process control and the robot control, and a servomechanism circuit connected to the actuators to control the position and motion of the tool centerpoint, the robot control comprising:
  (1) means responsive to stored sets of input signals for cyclically causing the actuators to move the tool centerpoint along successive paths to intersection positions,
  (2) means responsive to the arrival of the tool centerpoint at a path intersection position and to an adjust function signal for suspending the cyclic operation and for transmitting coordinate signals representing the current position of the tool centerpoint through the data communications interface to the process control,
  (3) means responsive to further input signals received from the process control during suspension of cyclic operation for causing the actuators to move the tool centerpoint to an adjusted position,
  (4) means for transmitting signals representing coordinates of the adjusted position through the data communications interface to the process control, and
  (5) means responsive to an acknowedge signal received from the process control for resuming the cyclic operation.

5. The apparatus of claim 4 wherein the tool centerpoint is caused to move to successive adjusted positions during suspension of cyclic operation as a result of repeated exchanges of sets of input signals and adjusted coordinate signals between the robot control and process control.

6. The apparatus of claim 5 wherein the robot control further comprises means responsive to an acknowledge signal received from the process control for storing a set of input signals representing an adjusted position in place of a programmed set of input signals representing a position having the adjust function signal associated therewith.

7. An apparatus for moving a tool centerpoint associated with one end of a function element along intersecting predetermined paths in response to sets of input signals representing rectangular coordinates of path intersections defining tool centerpoint positions and angular coordinates of function element orientations thereat, said apparatus being connected to a user process control, the user process control producing further sets of input signals representing rectangular coordinates of adjusted positions and angular coordinates of adjusted orientations, the adjusted positions and orientations being defined for selected programmed intersection positions having associated therewith adjust function signals, the apparatus comprising:
(a) a robot arm having actuators and arm members including:
  (1) a first plurality of actuators associated with the arm members for providing a plurality of axes of motion to move the tool centerpoint, and
  (2) a second plurality of actuators associated with the arm members and connected to the other end of the function element for providing a plurality of rotational axes of motion for rotating the function element through changes in angular orientation, said pluralities of axes of motion and the arm members defining a generalized coordinate system; and
(b) a robot control including a memory for storing sets of input signals, a data communications interface for exchanging sets of input signals between the user process control and the robot control, and a servomechanism circuit connected to the actuators to control the position and motion of the tool centerpoint between successive positions and simultaneously to rotate the function element about the tool centerpoint through continuous changes in orientation between successive angular orientations, the robot control comprising:
  (1) means responsive to the stored input signals for cyclically causing the actuators to move the tool centerpoint along the predetermined paths to successive positions and to rotate the function element about the tool centerpoint through continuous changes in orientation between successive angular orientations,
  (2) means responsive to the arrival of the tool centerpoint at a programmed position and to an adjust function signal for suspending the cyclic operation and for transmitting coordinate signals representing the current position of the tool centerpoint and current orientation of the function element through the data communications interface to the process control,
  (3) means responsive to a set of input signals received from the process control for causing the actuators to move the tool centerpoint along a predetermined path to an adjusted position and to rotate the function element to an adjusted orientation,
  (4) means for transmitting signals representing the coordinate of the adjusted position and adjusted orientation through the data communications interface to the process control, and
  (5) means responsive to an acknowledge signal received from the process control for resuming the cyclic operation.

8. The apparatus of claim 7 further comprising means for storing the set of input signals representing an adjusted position and adjusted orientation in place of the set of input signals representing the programmed position and orientation having the adjust function signal associated therewith.

* * * * *